(12) United States Patent
Ano

(10) Patent No.: US 10,055,065 B2
(45) Date of Patent: Aug. 21, 2018

(54) DISPLAY SYSTEM, PROJECTOR, AND CONTROL METHOD FOR DISPLAY SYSTEM

(71) Applicant: SEIKO EPSON CORPORATION, Tokyo (JP)

(72) Inventor: Takahiro Ano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 146 days.

(21) Appl. No.: 15/279,947

(22) Filed: Sep. 29, 2016

(65) Prior Publication Data

US 2017/0102784 A1   Apr. 13, 2017

(30) Foreign Application Priority Data

Oct. 8, 2015 (JP) .................. 2015-200024

(51) Int. Cl.
*G06F 3/042* (2006.01)
*H04N 13/04* (2006.01)
(Continued)

(52) U.S. Cl.
CPC .......... *G06F 3/0425* (2013.01); *G06F 3/038* (2013.01); *G06F 3/03545* (2013.01); *G06F 3/0416* (2013.01); *H04N 5/04* (2013.01); *H04N 9/3179* (2013.01); *H04N 13/0459* (2013.01); *G09G 2354/00* (2013.01); *G09G 2360/04* (2013.01)

(58) Field of Classification Search
CPC .... G06F 3/0416; G06F 3/03545; G06F 3/038; G06F 3/0383; G06F 3/0425
See application file for complete search history.

(56) References Cited

U.S. PATENT DOCUMENTS 6,839,061 B1    1/2005 Kamakura et al.
8,576,172 B2 *  11/2013 Hill ................. G06F 3/0428
                                                345/157
(Continued)

FOREIGN PATENT DOCUMENTS

JP    2000-330535 A    11/2000
JP    2008-116874 A     5/2008
JP    2013-247486 A    12/2013

*Primary Examiner* — Patrick F Marinelli
(74) *Attorney, Agent, or Firm* — Oliff PLC

(57) ABSTRACT

A projector includes a second projecting section configured to project a second portion of an image output by an information processing apparatus, a detecting section configured to detect a position of a pointer with respect to the projected second portion and generate second position information representing the in a coordinate system of the second portion, and a second transmitting section configured to transmit the second position information to the projector. Another projector includes a first projecting section configured to project the first portion, a receiving section configured to receive the second position information, and a first transmitting section configured to transmit position information obtained by converting the received second position information according to a coordinate system of the image or the second position information received by the receiving section to the information processing apparatus as first position information. The information processing apparatus performs processing corresponding to the first position information.

7 Claims, 6 Drawing Sheets

(51) Int. Cl.
*H04N 9/31* (2006.01)
*H04N 5/04* (2006.01)
*G06F 3/038* (2013.01)
*G06F 3/0354* (2013.01)
*G06F 3/041* (2006.01)

(56) References Cited

U.S. PATENT DOCUMENTS

| | | | | |
|---|---|---|---|---|
| 8,806,074 B2* | 8/2014 | Ichieda | G06F 3/0383 | 345/156 |
| 8,878,801 B2* | 11/2014 | Ichieda | G06F 3/033 | 345/173 |
| 8,943,231 B2* | 1/2015 | Ichieda | G06F 3/0383 | 345/156 |
| 8,992,027 B2* | 3/2015 | Ozawa | H04N 9/3179 | 345/1.3 |
| 9,495,523 B2* | 11/2016 | Ozawa | H04N 9/3179 | |
| 9,746,940 B2* | 8/2017 | Ichieda | G06F 3/033 | |
| 2010/0182234 A1* | 7/2010 | Takahashi | G03B 21/14 | 345/157 |
| 2012/0068955 A1* | 3/2012 | Hill | G06F 3/0428 | 345/173 |
| 2013/0010269 A1* | 1/2013 | Ozawa | H04N 9/3179 | 353/85 |
| 2013/0069870 A1* | 3/2013 | Ichieda | G06F 3/033 | 345/157 |
| 2013/0179599 A1* | 7/2013 | Ichieda | G06F 3/0383 | 710/8 |
| 2013/0314439 A1 | 11/2013 | Ota et al. | | |
| 2014/0317319 A1* | 10/2014 | Ichieda | G06F 3/0383 | 710/8 |
| 2015/0029098 A1* | 1/2015 | Ichieda | G06F 3/033 | 345/157 |
| 2015/0143513 A1* | 5/2015 | Ozawa | H04N 9/3179 | 726/19 |
| 2015/0347077 A1* | 12/2015 | Kataoka | G06F 3/1446 | 345/1.1 |
| 2016/0119507 A1* | 4/2016 | Duyvejonck | H04N 9/3147 | 348/512 |
| 2017/0052642 A1* | 2/2017 | Sato | G06F 3/0418 | |
| 2017/0102784 A1* | 4/2017 | Ano | G06F 3/0308 | |
| 2017/0127028 A1* | 5/2017 | Oike | H04N 9/3147 | |
| 2017/0277357 A1* | 9/2017 | Kihara | G06F 3/03545 | |
| 2017/0277358 A1* | 9/2017 | Kihara | G06F 3/0425 | |
| 2017/0295349 A1* | 10/2017 | Kasuga | H04N 9/3147 | |
| 2017/0322636 A1* | 11/2017 | Ichieda | G06F 3/03545 | |
| 2018/0011592 A1* | 1/2018 | Chen | G06F 3/0416 | |
| 2018/0039380 A1* | 2/2018 | Fujimori | G06T 11/203 | |
| 2018/0061262 A1* | 3/2018 | Nakashin | G06F 3/048 | |

* cited by examiner

DISPLAY SYSTEM, PROJECTOR, AND CONTROL METHOD FOR DISPLAY SYSTEM

CROSS-REFERENCE

The entire disclosure of Japanese Patent Application No. 2015-200024, filed Oct. 8, 2015 is expressly incorporated by reference herein.

BACKGROUND

1. Technical Field

The present invention relates to a display system, a projector, and a control method for the display system.

2. Related Art

As an invention for dividing one screen and displaying the screen in a plurality of projectors, there is, for example, a system disclosed in JP-A-2008-116874 (Patent Literature 1). In the system, image output apparatuses are respectively connected to the plurality of projectors. Drawn image data related to a drawn image generated by an image drawing apparatus is sent to the image output apparatuses. The image output apparatuses segment, from the image of the drawn image data, portions to be displayed by the projectors connected to the image output apparatuses and output partial image data related to segmented images. When the projectors project images of the partial image data supplied from the image output apparatuses, the images projected by the projectors are arranged and displayed as one screen.

JP-A-2013-247488 (Patent Literature 2) discloses a projection system including a drawing mode for drawing an image in a pointed position of a detected pointer and a PC operation mode for using the pointer as a pointing device of a PC (Personal Computer). With the system, it is possible to perform drawing with the pointer on a projected screen and perform operation of the PC with the pointer.

When the technique for dividing one screen and displaying the screen in the plurality of projectors is combined with the technique for using the pointer as the pointing device, each of the plurality of projectors is connected to the PC and information concerning the position of the pointer is sent from the projectors to the PC. Therefore, connection between the PC and the projectors is complicated.

SUMMARY

An advantage of some aspects of the invention is to provide a technique for making it possible to operate an information processing apparatus with a pointer without complicating connection between a plurality of projectors and the information processing apparatus.

An aspect of the invention provides a display system including: an information processing apparatus; a first projector; and a second projector. The first projector projects a first portion of an image output by the information processing apparatus onto a projection surface. The second projector projects a second portion of the image onto the projection surface. The second projector includes: a second projecting section configured to project the second portion onto the projection surface; a detecting section configured to detect a position of a pointer with respect to the second portion projected on the projection surface and generate second position information representing a position of the pointer in a coordinate system of the second portion; and a second transmitting section configured to transmit the second position information generated by the detecting section to the first projector. The first projector includes: a first projecting section configured to project the first portion onto the projection surface; a receiving section configured to receive the second position information transmitted by the second transmitting section; and a first transmitting section configured to transmit position information obtained by converting the second position information received by the receiving section according to a coordinate system of the image or the second position information received by the receiving section to the information processing apparatus as first position information. The information processing apparatus receives the first position information transmitted by the first transmitting section and performs processing corresponding to the received first position information.

According to the aspect of the invention, it is possible to operate the information processing apparatus with the pointer without complicating connection between the plurality of projectors and the information processing apparatus.

In the display system according to the aspect of the invention, the first projector may include a coordinate converting section configured to convert the second position information received by the receiving section into the first position information according to the coordinate system of the image.

With this configuration, since the first projector performs the conversion of the second position information, the information processing apparatus can use the position information without performing the conversion of the position information.

In the display system according to the aspect of the invention, when the first transmitting section transmits the second position information as the first position information the first transmitting section may transmit information representing the second portion to the information processing apparatus together with the first position information, and the information processing apparatus may receive the information representing the second portion and the first position information transmitted by the first transmitting section and perform processing corresponding to the received information representing the second portion and the received first position information.

With this configuration, the information processing apparatus can convert the first position information transmitted from the first projector and perform the processing according to the first position information after the conversion.

In the display system according to this aspect of the invention, the first projector may include a second detecting section configured to detect a position of the pointer with respect to an image of the first portion projected on the projection surface and generate position information representing a position of the pointer in a coordinate system of the first portion, and, when the pointer moves across a boundary between the first portion and the second portion, the first projector may recognize the position information generated by the second detecting section and the second position information as position information of the same pointer.

With this configuration, even if the pointer moves across the boundary between the first portion and the second portion, it is possible to process the position information generated by the second detecting section and the second position information as position information of the same pointer.

In the display system according to this aspect of the invention, the pointer may be a finger of a user, and, when the finger moves across the boundary between the first portion and the second portion, the first projector may recognize the position information generated by the second detecting section and the second position information as position information of the same finger.

With this configuration, even if the finger, which is the pointer, moves across the boundary between the first portion and the second portion, it is possible to process the position information generated by the second detecting section and the second position information as position information of the same finger.

Another aspect of the invention provides a projector including: a projecting section configured to project a first portion of an image output by an information processing apparatus onto a projection surface; a receiving section configured to receive second position information from a second projector, the second projector projecting a second portion of the image output by the information processing apparatus onto the projection surface, the second projector detecting a position of a pointer with respect to the second portion projected on the projection surface, the second projector transmitting the second position information representing a position of a pointer in a coordinate system of the second portion, the second position information; and a first transmitting section configured to transmit position information obtained by converting the second position information received by the receiving section according to a coordinate system of the image or the second position information received by the receiving section to the information processing apparatus as first position information.

According to this aspect of the invention, it is possible to operate the information processing apparatus with the pointer without complicating connection between the plurality of projectors and the information processing apparatus.

Still another aspect of the invention provides a control method for a display system including a first projector and a second projector, the first projector projecting a first portion of an image output by the information processing apparatus onto a projection surface and the second projector projecting a second portion of the image onto the projection surface, the control method including: allowing the second projector to detect a position of a pointer with respect to the second portion projected on the projection surface and generate second position information representing a position of the pointer in a coordinate system of the second portion; allowing the second projector to transmit the second position information to the first projector; allowing the first projector to receive the second position information; allowing the first projector to transmit position information obtained by converting the second position information according to a coordinate system of the image or the second position information to the information processing apparatus as first position information; and allowing the information processing apparatus to receive the first position information and performing processing corresponding to the received first position information.

According to this aspect of the invention, it is possible to operate the information processing apparatus with the pointer without complicating connection between the plurality of projectors and the information processing apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
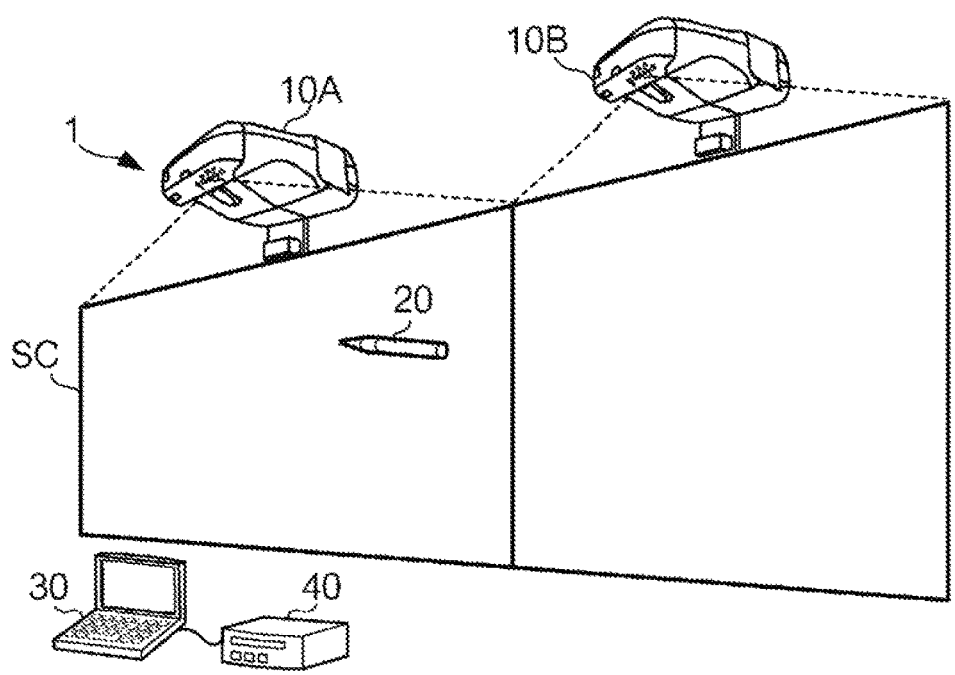
FIG. 1 is a diagram showing apparatuses configuring a display system.

FIG. 1 is a diagram showing apparatuses configuring a display system 1 according to an embodiment of the invention. The display system 1 is configured by a projector 10A (a first projector) and a projector 10B (a second projector) that project images onto a screen SC functioning as a display surface, a pointer 20, an information processing apparatus 30, and a distributing apparatus 40.

The projectors 10A and 10B, which are examples of a display apparatus, are connected to the information processing apparatus 30 by wire or radio. The projectors 10A and 10B project an image represented by a video signal supplied from another apparatus onto the screen SC. The video signal is an example of image information representing the image. The projectors 10A and 10B include a PC operating function for using the pointer 20 as a pointing device (a digitizer) of the information processing apparatus 30. The projectors 10A and 10B are set obliquely above the screen SC and project videos onto the screen SC. Note that, in this embodiment, the projectors 10A and 10B project videos onto the screen SC. However, the projectors 10A and 10B may project videos onto a wall screen (a display surface) instead of the screen SC. In this embodiment, the projectors 10A and 10B are set on the wall surface by metal fittings. However, the projectors 10A and 10B may be set on a ceiling. The projectors 10A and 10B may be set on a desk and project videos onto the desk instead of the screen SC.

The pointer 20 of a pen type functions as a pointing device for operating the projector 10 or the information processing apparatus 30.

In this embodiment, the information processing apparatus 30 is a personal computer.

The distributing apparatus 40 is an apparatus that distributes a video signal supplied from the information processing apparatus 30 to the projectors 10A and 10B. The distributing apparatus 40 generates a video signal supplied to the projector 10A and a video signal supplied to the projector 10B from the video signal supplied from the information processing apparatus 30 and supplies the generated video signals to the projectors 10A and 10B. In this embodiment, the distributing apparatus 40 divides an image represented by the video signal supplied from the information processing apparatus 30 into left and right two images, supplies a video signal of the left image (a first portion) to the projector 10A, and supplies a video signal of the right image (a second portion) to the projector 10B.

The projector 10A projects the left image represented by the video signal supplied from the distributing apparatus 40. The projector 10B projects the right image represented by the video signal supplied from the distributing apparatus 40. By displaying the left image projected by the projector 10A and the right image projected by the projector 10B side by side on the left and the right (so-called tiling display), it is possible to display the image of the video signal supplied by the information, processing apparatus 30 larger than when the image is projected by one projector.

Figure 2:
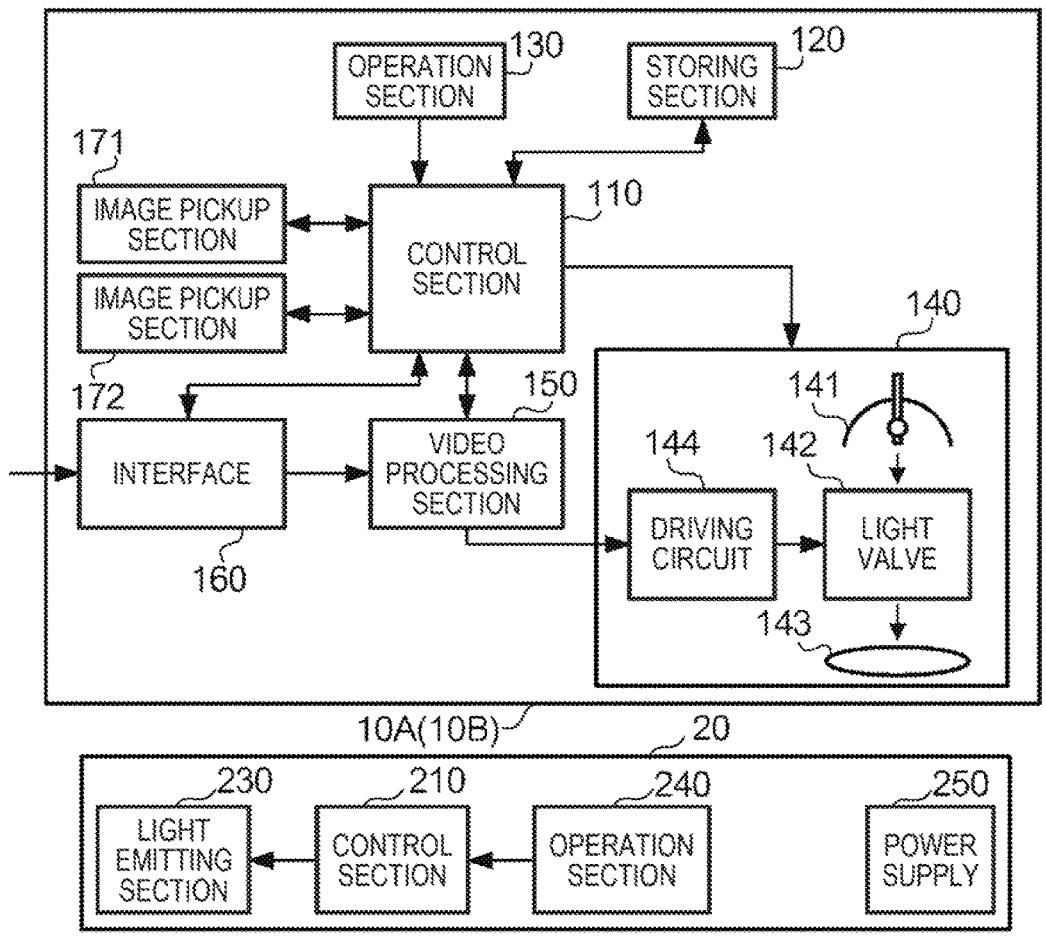
FIG. 2 is a diagram showing the hardware configurations of a projector and a pointer.

FIG. 2 is a diagram showing the hardware configurations of the projectors 10A and 10B and the pointer 20. The pointer 20 includes a control section 210, a light emitting section 230, an operation section 240, and a power supply 250. The power supply 250 is, for example, a dry battery or a secondary battery and supplies electric power to the control section 210, the light emitting section 230, and the operation section 240. The operation section 240 includes a switch (not shown in the figure) for controlling the power supply from the power supply 250 to the sections. When the switch of the operation section 240 is turned on, electric power is supplied from the power supply 250 to the sections. When the switch of the operation section 240 is turned off, the supply of the electric power from the power supply 250 to the sections is stopped. The light emitting section 230 includes a light emitting diode that emits an infrared ray. The light emitting section 230 is provided at the tip of the pointer 20. Lighting and extinction of the light emitting section 230 are controlled by the control section 210. The light emitting section 230 is a point light source. Light emitted by the light emitting section 230 spreads from the tip of the pointer 20 onto a spherical surface. The control section 210 is connected to the light-emitting section 230 and the operation section 240. The control section 210 starts the control of the light emitting section 230 according to operation performed in the operation section 240 and controls lighting and extinction of the light emitting diode of the light emitting section 230.

Each of the projectors 10A and 10B includes a control section 110, a storing section 120, an operation section 130, and a projecting section 140. Each of the projectors 10A and 10B includes a video processing section 150, an interface 160, an image pickup section 171, and an image pickup section 172. In this embodiment, the hardware configurations of the projectors 10A and 10B are the same. In the following explanation, when it is necessary to distinguish the sections of the projectors 10A and 10B, for convenience of explanation, "A" is added to the ends of signs of the sect ions of the projector 10A and "B" is added to the ends of signs of the sections of the projector 10B. When it is unnecessary to distinguish the sections, the addition of "A" and "B" to the ends of the signs is omitted.

The interface 160 includes a plurality of connectors to which a video signal is supplied such as RCA, D-Bus, and HDMI (registered trademark). The interface 160 supplies a video signal supplied from another apparatus to the connectors to the video processing section 150. The interface 160 includes an interface for radio communication such as a wireless LAN (Local Area Network) or a Bluetooth (registered trademark) and an interface for wired communication such as a USB (Universal Serial Bus) and a wired LAN. The interface 160 performs transmission and reception of information.

The storing section 120 stores setting values related to image quality of videos to be projected and information related to setting of various functions. The operation section 130 includes a plurality of buttons for operating the projector 10. The control section 110 controls the sections according to operated buttons, whereby adjustment of a video projected on the screen SC, setting of various functions of the projector 10, and the like are performed.

The video processing section 150 acquires a video signal supplied from the interface 160. The video processing section 150 acquires, from the control section 110, a signal of an on-screen image such as a GUI for operating the projector 10. The video processing section 150 includes various image processing functions, applies image processing to the video signal supplied from the interface 160, and adjusts image quality of a video to be projected. When the signal of the on-screen image is supplied from the control section 110, the video processing section 150 supplies a video signal on which the signal of the on-screen image is superimposed to the projecting section 140.

The projecting section 140, which projects a video, includes a light source 141, a light valve 142, a driving circuit 144, and a projection optical system 143. The light source 141 is a lamp that emits light. The light emitted by the light source 141 is split into red, green, and blue lights by a plurality of dichroic mirrors and a plurality of mirrors not shown in the figure. The split red, green, and blue lights are led to the light valve 142. Note that the light source 141 may be, instead of the lamp, a light emitting diode or a semiconductor laser device that emit a laser beam.

The driving circuit 144 acquires a video signal supplied from the video processing section 150. The video signal supplied to the driving circuit 144 has gradation data representing gradation of a red component in an image to be projected, gradation data representing gradation of a green component in the image to be projected, and gradation data representing gradation of a blue component in the image to be projected. The driving circuit 144 extracts the gradation data of the respective colors of the red, green, and blue and drives the light valve 142 on the basis of the extracted gradation data of the colors.

The light valve 142 includes a liquid crystal light valve on which the red light is made incident, a liquid crystal light valve on which the green light is made incident, and a liquid crystal light valve on which the blue light is made incident. The liquid crystal light valve is a transmissive liquid crystal panel and includes pixels arranged in a matrix shape in a plurality of rows and a plurality of columns. The liquid crystal light valve on which the red light is made incident is driven on the basis of the gradation data of red. The liquid crystal light valve on which the green light is made incident is driven on the basis of the gradation data of green. The liquid crystal light valve on which the blue light is made incident is driven on the basis of the gradation data of blue. The pixels of the liquid crystal light valves are controlled by the driving circuit 144 and the transmittance of the pixels changes. Since the transmittance of the pixels is controlled, the lights of the respective colors transmitted through the liquid crystal light valves change to images corresponding to the respective gradation data. The images of the red, green, and blue lights transmitted through the liquid crystal light valves are combined by a not-shown dichroic prism and made incident on the projection optical system 143. The projection optical system 143 is an optical system that enlarges the incident images. The projection optical system 143 enlarges the incident images with a lens and a mirror and projects the images onto the screen SC. When the images are projected onto the screen SC, the images are displayed on the screen SC, which is the display surface. Note that a reflective liquid crystal panel may be adopted instead of the transmissive liquid crystal panel or a digital mirror device or the like may be used.

The projector 10 includes two image pickup sections 171 and 172 in order to specify, in a stereo system, the position of the pointer 20 and the distance from the pointer 20 to the screen SC. The image, pickup sections 171 and 172 include image pickup elements (CMOSs, CCDs, or the like) that receive an infrared ray emitted by the light emitting section 230, optical systems that form images on the image pickup elements, and diaphragms that limit lights made incident on the image pickup elements. The image pickup sections 171 and 172 have a projection range of the projecting section 140 as an image pickup range, generate images in the image pickup ranges, and output image signals representing the generated images. Note that, in this embodiment, the projectors 10A and 10B are set obliquely above the screen SC. Therefore, the image pickup sections 171 and 172 pick up images in the projection range from obliquely above.

The control section 110 is a microcomputer including a CPU (Central Processing Unit), a ROM (Read Only Memory), and a RAM (Random Access Memory). When the CPU executes a computer program stored, in the ROM, in the projectors 10A and 10B, the control sections 110 control the sections. A function for projecting a video onto the screen SC, the PC operating function, a tiling display function for performing the tiling display, and the like are realized.

When the tiling display function is used, setting related to the tiling display is performed in the projectors 10A and 10B, whereby one projector functions as a master projector and the other projector functions as a slave projector. In this embodiment, the projector 10A is set as the master projector and the projector 10B is set as the slave projector. Note that, when the setting related to the tiling display is performed, the projectors 10A and 10B store tiling numbers representing which images from the left the projectors 10A and 10B are displaying in the tiling display. For example, the projector 10A that displays the divided left image stores "1" in the storing section 120A as the tiling number. The projector 10B that displays the divided right image stores "2" in the storing section 120B as the tiling number.

In the projector 10B, which is the slave projector, by performing the setting related to the tiling display, the projector 10B stores an IP address of the projector 10A set as a transmission destination of information related to the tiling display.

Figure 3:
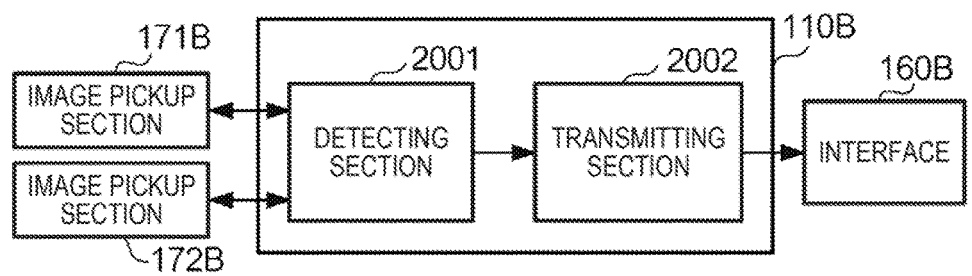
FIG. 3 is a functional block diagram of functions realized in a control section.

FIG. 3 is a functional block diagram of functions realized in the control section HOB by executing the computer program stored in the ROM. A detecting section 2001 acquires images generated by the image pickup sections 171B and 172B and specifies, from the images generated by the image pickup sections 171B and 172B, a coordinate of the position of the pointer 20 (that is, a coordinate of the tip of the pointer 20) in a display region of an image projected by the projector 10B and the distance from the pointer 20 to the screen SC, which is the display surface of the image (that is, the distance from the tip of the pointer 20 to the screen SC). A transmitting section 2002 (a second transmitting section) transmits the tiling number stored by the storing section 120B and the coordinate (X2, Y2) and the distance specified by the detecting section 2001 from the interface 160B to the projector 10A via a LAN.

Figure 4:
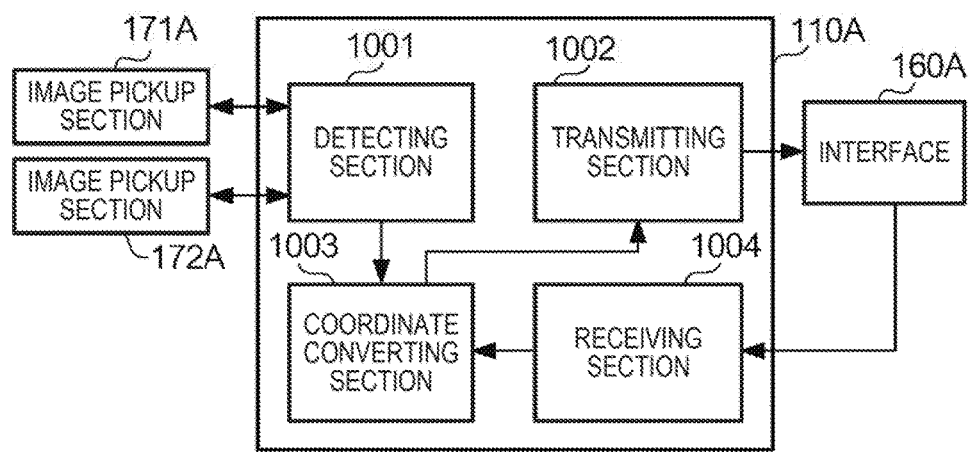
FIG. 4 is a functioning block diagram of functions realized in another control section.

FIG. 4 is a functional block diagram of functions realized in the control section 110A by executing the computer program stored in the ROM. A detecting section 1001 acquires images generated by the image pickup sections 171A and 172A and specifies, from the images generated by the image pickup sections 171A and 172A, a coordinate of the position of the pointer 20 (that is, a coordinate of the tip of the pointer 20) in a display region of an image projected by the projector 10A and the distance from the pointer 20 to the screen SC, which is the display surface of the image (that is, the distance from the tip of the pointer 20 to the screen SC). A receiving section 1004 receives the coordinate transmitted from the projector 10B and received by the interface 160A. A coordinate converting section 1003 converts the coordinate specified by the detecting section 1001 or the coordinate received by the receiving section 1004 into position information corresponding to a coordinate system of an image output by the information processing apparatus 30. A transmitting section 1002 (a first transmitting section) transmits a coordinate obtained by performing conversion processing of the coordinate converting section 1003 from the interface 160A to the information processing apparatus 30 via a LAN.

Operation Example of the Embodiment

Figure 5:
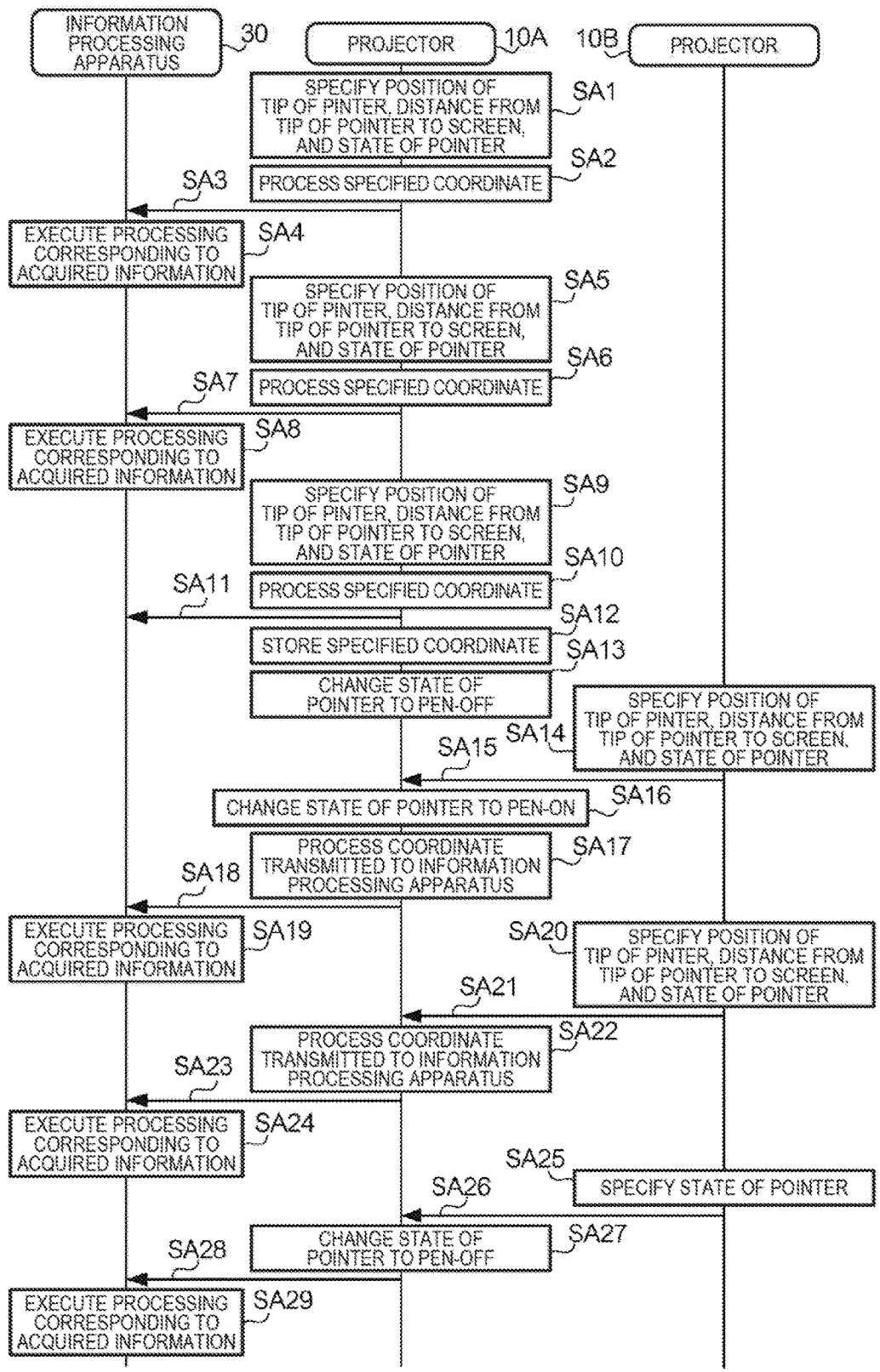
FIG. 5 is a sequence chart for explaining an operation example.

FIG. 5 is a sequence chart showing a flow of processing performed by the control section 110A of the projector 10A. An operation example of this embodiment is explained with reference to FIG. 5.

In this embodiment, the information processing apparatus 30 is connected to the projector 10A by a USB cable and connected to the distributing apparatus 40 by a video cable. The distributing apparatus 40 and the projectors 10A and 10B are connected by video cables. The projector 10A and the projector 10B are connected, by a LAN.

The information processing apparatus 30 outputs a video signal of a screen displayed on a display device of the information processing apparatus 30 to the distributing apparatus 40. The distributing apparatus 40 divides an image represented by the video signal output from the information processing apparatus 30 into left and right two images, supplies a video signal of the left image to the projector 10A, and supplies a video signal of the right image to the projector 10B. The video signal supplied from the distributing apparatus 40 to the interface 160A is subjected to image processing by the video processing section 150A and supplied to the projecting section 140A (a first projecting section). The projecting section 140A projects an image represented by the supplied video signal onto the screen SC, The video signal supplied from the distributing apparatus 40 to the interface 160B is subjected to image processing by the video processing section 150B and supplied to the projecting section 140B (a second projecting section). The projecting section 140B projects an image represented by the supplied video signal onto the screen SC.

Figure 6:
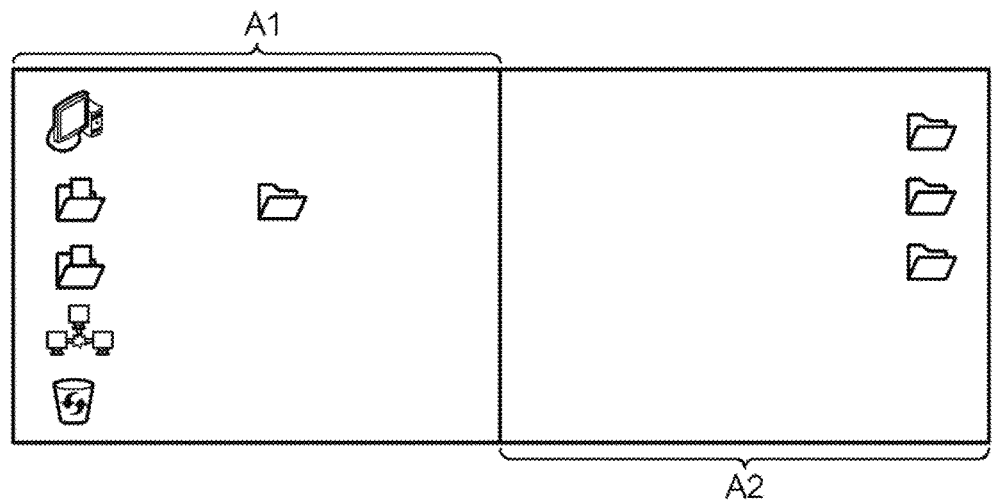
FIG. 6 is a diagram showing an example of an image displayed on a screen SC.

FIG. 6 is an example of images projected by the projectors 10A and 10B to which the video signals are supplied from, the distributing apparatus 40. For example, when the information processing apparatus 30 displays an image of a desktop in the display device of the information processing apparatus 30, a video signal of the image of the desktop is output from the information processing apparatus 30. The projector 10A projects a left half of the image of the desktop. The projector 10B projects a right half of the image of the desktop.

A display region A1 indicated by a rectangle in FIG. 6 is a display region of the image projected by the projector 10A. The image pickup sections 171A and 172A photograph a region including the display region A1. In images generated by the image pickup sections 171A and 172A, the control section 110A sets an xy coordinate with an upper left vertex of the display region A1 set as an origin, the right direction from the origin set as a positive direction of an x axis, and the downward direction from the origin set as a positive direction of a y axis. A display region A2 indicated by a rectangle in FIG. 6 is a display region of the image projected by the projector 10B, The image pickup sections 171B and 172B photograph a region including the display region A2. In images generated by the image pickup sections 171B and 172B, the control section 110B sets an xy coordinate with an upper left vertex of the display region A2 set as an origin, the right direction from the origin set as a positive direction of an x axis, and the downward direction from the origin set as a positive direction of a y axis.

When the pointer 20, which is emitting an infrared ray, enters photographing ranges of the image pickup sections 171A and 172A, in the images generated by the image pickup sections 171A and 172A, an infrared ray emitted by the light emitting section 230 appears. The control section 110A acquires the images generated by the image pickup sections 171A and 172A. The control section 110A specifies, from the images generated by the image pickup sections 171A and 172A, a coordinate of the position of the infrared ray (that is, a coordinate of the tip of the pointer 20) in the xy coordinate of the display region A1 and the distance from the infrared ray to the screen SC, which is the display surface of the images (that is, the distance from the tip of the pointer 20 to the screen SC). For example, when the user brings the tip of the pointer 20 into contact with a position P1 shown in FIG. 7, the control section 110A specifies a coordinate of the position P1 from the images generated by the image pickup sections 171A and 172A. The control section 110A records the specified coordinate (X1, Y1) and the distance in the RAM. When the distance from the infrared ray to the screen SC is 0, the control section 110A sets a state of the pointer 20 to a pen-on state in which the pointer 20 is in contact with the screen SC (step SA1). Note that, in this embodiment, the resolution of the detection of the position of the pointer 20 in the projectors 10A and 10B is the same as the resolution of the pointing device in the information processing apparatus 30.

Subsequently, the control section 110A processes the detected coordinate according to the number of divisions of the screen in the tiling display and transmits the coordinate to the information processing apparatus 30. Specifically, in a coordinate of the pointing device in the information processing apparatus 30, upper left vertexes of images displayed in the display region A1 and the display region A2 are set as origins, the right direction from the origins is set as a positive direction of an x axis, and the downward direction from the origins is set as a positive direction of a y axis. On the other hand, in the projectors, since the detection of the coordinate of the position of the tip of the pointer 20 is performed for each of the display regions, if the coordinate of the position detected in the projectors is directly transmitted to the information processing apparatus 30, the information processing apparatus 30 recognizes a position different from, a position pointed by the pointer 20 on the screen SC.

Therefore, in this embodiment, when specifying the coordinate of the position of the tip of the pointer 20, the control section 110A processes an x coordinate of the coordinate transmitted to: the information processing apparatus 30 according to Expression (1) (step SA2).

$$X=(X1/\text{the number of screen divisions}) \quad (1)$$

For example, when an x coordinate of P1 is "100", the number of screen divisions in the tiling display is 2. Therefore, an x coordinate after the processing is "50". Note that, concerning a y coordinate of the position of the tip of the pointer 20, a y coordinate after the processing is represented as y=Y1.

The control section 110A transmits information indicating the state (pen-on) of the pointer 20, a coordinate (x, y) after the processing, and the detected distance to the information processing apparatus 30 from the interface 160A via a USB cable (step SA3). The coordinate transmitted to the information processing apparatus 30 is an example of first position information according to the invention. When acquiring the information transmitted from the projector 10A, the information processing apparatus 30 performs processing corresponding to the acquired information (step SA4), For example, when the acquired coordinate is a position P1 on an icon and the information representing the state of the pointer 20 changes from a pen-off state in which the pointer 20 is separated from the screen SC to the pen-on state, the icon in the P1 position is dragged.

Figure 7:
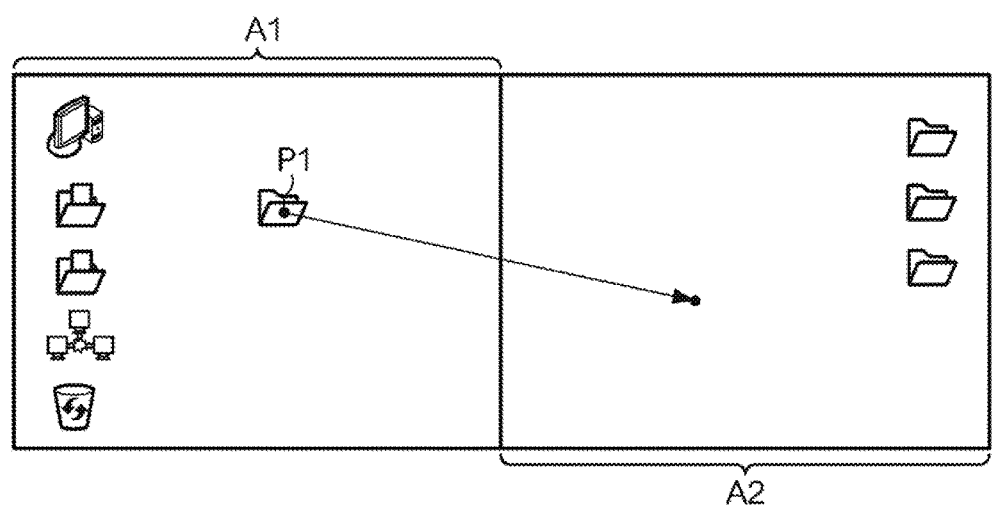
FIG. 7 is a diagram for explaining an operation example.

Subsequently, when the user moves the pointer 20 in an arrow direction shown in FIG. 7 from the position P1, the control section 110A specifies the state of the pointer 20, the coordinate of the position of the tip of the pointer 20, and the distance from the pointer 20 to the screen SC (step SA5). The control section 110A processes the specified coordinate of the position according to the number of divisions of the screen in the tiling display (step SA6). The control section 110A transmits the information indicating the state of the pointer 20, the coordinate after the processing, and the detected distance to the information processing apparatus 30 (step SA7). When the information processing apparatus 30 performs processing corresponding to the information transmitted from the projector 10A (step SA8), the icon in the position P1 moves according to the movement of the pointer 20.

Figure 8:
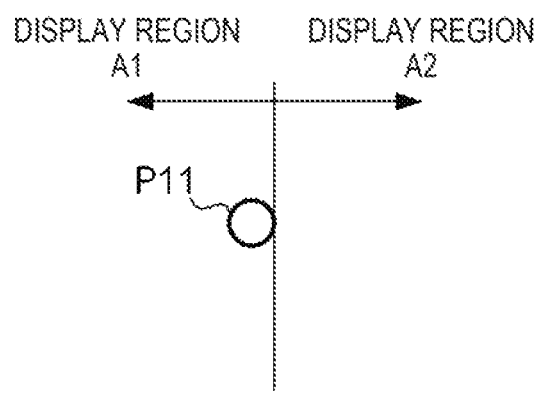
FIG. 8 is a diagram for explaining an operation example.

Subsequently, when the position of the tip of the pointer 20 changes to a position at the right end of the display region A1 as shown in FIG. 8, the control section 110A transmits the information representing the state of the pointer 20, the coordinate after the processing of the specified coordinate, and the specified distance to the information processing apparatus 30 (steps SA9 to SA11) and causes the RAM to store a specified coordinate (X1, Y1) (step SA12).

Figure 9:
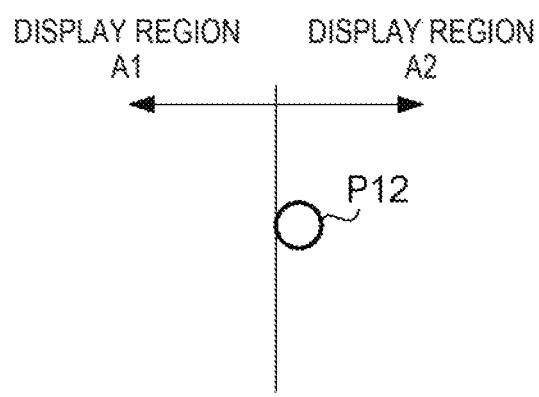
FIG. 9 is a diagram for explaining an operation example.

Subsequently, when the position of the tip of the pointer 20 moves from the display region A1 to the display region A2 and changes to a position at the left end of the display region A2 as shown in FIG. 9, the infrared ray of the pointer 20 is not projected in the image pickup sections 171A and 172A and is projected in the image pickup sections 171B and 172B.

When the infrared ray does not appear in images generated by the image pickup sections 171A and 172A, the control section 110A changes the state of the pointer 20 to the pen-off state in which the pointer 20 is separated from the screen SC (step SA13).

The control section 110B acquires images generated by the image pickup sections 171B and 172B and specifies, from the images generated by the image pickup sections 171B and 172B, a coordinate of the position of the infrared ray (that is, a coordinate of the tip of the pointer 20) in the xy coordinate of the display region A2 and the distance from the infrared ray to the screen SC, which is the display surface of the images (that is, the distance from the tip of the pointer 20 to the screen SC). When the distance from the infrared ray to the screen SC is 0, the control section 110B changes the state of the pointer 20 to the pen-on state (step SA14). Subsequently, the control section 110B transmits information indicating the pen-on, the tiling number stored by the storing section 120B, a specified coordinate (X2, Y2), and the specified distance from the interface 160B to the projector 10A via a LAN (step SA15). The coordinate transmitted from the projector 10B to the projector 10A is an example of second position information according to the invention.

When the interface 160A acquires the information indicating the pen-on, the tiling number, the coordinate, and the distance transmitted from the projector 10B, the control section 110A acquires a latest coordinate among the coordinates stored in the RAM and determines whether a difference between a y coordinate of the latest coordinate acquired from the RAW and a y coordinate of the coordinate transmitted from the projector 10B is smaller than a threshold. When the difference between the y coordinate of the latest coordinate acquired from the RAM and the y coordinate of the coordinate transmitted from the projector 10B is smaller than the threshold, the control section 110A returns the state of the pointer 20 to the pen-on state (step SA16).

Subsequently, the control section 110A processes an x coordinate of the coordinate transmitted to the information processing apparatus 30 according to Expression (2) (step SA17).

$$x=(X2/\text{the number of screen divisions})+((\text{the resolution of the pointing device of the information processing apparatus 30})/\text{the number of screen divisions})\times(\text{the tiling number of the projector } 10B-1)) \quad (2)$$

Note that, in this embodiment, the resolution of the pointing device of the information processing apparatus 30 is set to "32767".

The control section 110A transmits the information indicating the state (pen-on) of the pointer 20, a coordinate (x, y) after the processing, and the distance acquired from the projector 10B to the information processing apparatus 30 (step SA18). When acquiring the coordinate transmitted from the projector 10A, the information processing apparatus 30 executes processing corresponding to the acquired information and moves the dragged icon to the position of the acquired coordinate (step SA19).

Subsequently, when the user move's the pointer 20 within the display region A2, the control section HOB specifies a state of the pointer 20, a coordinate of the position of the pointer 20, and the distance from the pointer 20 to the screen SC (step SA20). The control section 110B transmits the tiling number stored in the storing section 120B, the information indicating the pen-on, the detected coordinate of the position, and the detected distance to the projector 10A (step SA21).

When the interface 160A acquires the information transmitted from the projector 10B, if the control section 110A sets the state of the pointer 20 to the pen-on state, the control section 110A processes the acquired coordinate according to the number of divisions of the screen in the tiling display (step SA22). The control section 110A transmits the information representing the state of the pointer 20, a coordinate after the processing, and the distance acquired from the projector 10B to the information processing apparatus 30 (step SA23). When the information processing apparatus 30 performs processing corresponding to the information transmitted from the projector 10A (step SA24), the dragged icon moves.

Subsequently, when the user moves the image pickup section 171A, the image pickup section 172A, the image pickup section 171B, and the image pickup section 172B to the outside of the photographing range, the infrared ray emitted by the pointer 20 is not projected in the image pickup section 171A, the image pickup section 172A, the image pickup section 171B, and the image pickup section 172B. When the infrared ray does not appear in the images generated by the image pickup sections 171B and 172B, the control section 110B changes the state of the pointer 20 to the pen-off state in which the pointer 20 is separated from the screen SC (step SA25). When determining that the state of the pointer 20 is pen-of state; the control section 110B transmits information indicating the pen-off state to the projector 10A (step SA26).

When the interface 160A acquires the information indicating the pen-off state, the control section 110A changes the state of the pointer 20 to the pen-off state (step SA27). The control section 110A transmits information indicating the state (pen-off) of the pointer 20 to the information processing apparatus 30 (step SA28). When acquiring the information transmitted from the projector 10A, the information processing apparatus 30 ends the processing of the drag according to the acquired information (step SA29).

Modifications

The embodiment of the invention is explained above. However, the invention is not limited to the embodiment and can be carried out in other various forms. For example, the invention may be carried out by modifying the embodiment as explained below. Note, that the embodiment and one or a plurality of modifications explained below may be combined and carried out as appropriate.

In the embodiment, the projector 10A processes the coordinate of the position of the pointer 20 detected by the projectors and transmits the coordinate to the information processing apparatus 30. However, the invention is not limited to this configuration. For example, the projector 10A may transmit the tiling number and the coordinate detected by the projectors to the information processing apparatus 30. The information processing apparatus 30 may process the coordinate.

Specifically, when detecting the position of the tip of the pointer 20, the projector 10A transmits the tiling number stored in the storing section 120A and a coordinate of the detected position of the tip of the pointer 20 to the information processing apparatus 30. When the tiling number acquired together with the coordinate is "1", the information processing apparatus 30 processes the coordinate according to Expression (1) described above and performs processing using a coordinate after the processing.

When detecting the position of the tip of the pointer 20, the projector 10B transmits the tiling number stored in the storing section 120B and a coordinate of the detected position of the tip of the pointer 20 to the projector 10A. The projector 10A transfers the tiling number and the coordinate transmitted from the projector 10B to the information processing apparatus 30. When the tiling number acquired together with the coordinate is "2", the information processing apparatus 30 processes the coordinate according to Expression (2) described above and performs processing using a coordinate after the processing.

When the tiling number is transmitted to the image processing apparatus 30, a configuration may be adopted in which the distributing apparatus 48 is not used, an extended desktop function is used in the information processing apparatus 30, and one of the projector 10A and the projector 10B is set as a primary device and the other is set as a secondary device.

In the explanation of the operation example, the screen represented by the video signal output by the information processing apparatus 30 is the image of the desktop. However, the information processing apparatus 30 may execute an application program and output a video signal of another screen. For example, the information processing apparatus 30 may execute a drawing program for drawing an image with a pointing device. When the information processing apparatus 30 is executing the drawing program, the information processing apparatus 30 performs drawing according to a coordinate and various kinds of information transmitted from the projector 10A.

For example, when the information processing apparatus 30 is executing the drawing program, the information processing apparatus 30 draws a line corresponding to a moving track of the pointer 20 according to a coordinate transmitted from the projector 10A, When the user moves the pointer 20 from the display region A1 to the display region A2 or moves the pointer 20 from the display region A2 to the display region A1 while keeping the pointer 20 in contact with the screen SC, a line extending over the display region A1 and the display region A2 is displayed on the screen SC.

In the invention, each of the projectors 10A and 10B may include a light emitting device that forms a layer of light extending along the screen SC. The light emitting device includes a light emitting section that emits light for irradiating a finger (in this modification, an infrared ray). The light emitting device is set above the upper end of the screen SC and emits the light downward to be dispersed in a range of an angle θ. The light emitted from the light emitting device form the layer of the light extending along the screen SC. In this modification, the angle θ reaches nearly 180 degrees. The layer of light is formed over substantially the entire screen SC. The surface of the screen SC and the layer of the light formed by the light emitting device are desirably close to each other. The layer of the light has thickness to be able to irradiate a finger present in a position away from the surface of the screen SC. Light emitting sections may be stacked to radiate the infrared ray on the finger present in the position away from the screen SC. The emission of the light from the light emitting device is controlled by the projector corresponding to the emission of the light. When the user moves the finger to the position of the layer of the light, the infrared ray reflected, on the finger is photographed by the image pickup sections 171 and 172. The projectors 10A and 10B specify a coordinate of the position of the photographed infrared ray.

The projector 10B transmits the specified coordinate to the projector 10A. The projector 10A processes the coordinate transmitted from the projector 10B and transmits the coordinate to the information processing apparatus 30. When the projector IDA specifies a coordinate of the position of the finger, the projector 10A processes the specified coordinate and transmits the coordinate to the information processing apparatus 30.

In a configuration in which each of the projectors 10A and 10B includes the light emitting device and detects a coordinate of the position of the finger, when the user brings a plurality of fingers into contact with the screen SC, a plurality of infrared rays appear in images generated by the image pickup sections 171 and 172. In this case, the projector may recognize the photographed infrared rays as the fingers, add identifiers to the respective recognized fingers, and distinguish the positions of the plurality of fingers.

For example, when the index finger of the user enters a photographing range of the image pickup sections 171A and 172A within the display region A1, an infrared ray reflected on the index finger appears in images generated by the image pickup sections 171A and 172A. As in the case where the pointer 20 is used, the control section 110A specifies a coordinate of the position of the infrared ray from the images generated by the image pickup sections 171A and 172A. The control section 110A recognizes the infrared ray appearing in the images generated by the image pickup sections 171A and 172A as a finger and adds an identifier (e.g., "1") to the recognized finger. The control section 110A processes the coordinate of the detected position of the finger according to Expression (1) as in the embodiment. The control section 110A transmits a coordinate after the processing and an identifier of the finger corresponding to the coordinate to the information processing apparatus 30.

When the user moves the fingers while keeping the fingers in contact with the screen SC and the position of the index finer reaches the position of the right end of the display region A1, the control section 110A transmits the coordinate after the processing of the specified coordinate to the information processing apparatus 30 and causes the RAH to store the detected coordinate (X1, Y1). When the position of the index finger moves from the display region A1 to the display region A2 and reaches the position at the left end of the display region A2, the infrared ray reflected on the index finger is not projected in the image pickup sections 171A and 172A and is projected in the image pickup sections 171B and 172B.

When the infrared ray does not appear in the images generated by the image pickup sections 171A and 172A, the control section 110A changes a state of the finger, the identifier of which is "1", to the pen-off state in which the finger is separated from the screen SC.

As in the case where the pointer 20 is used, the control section 110B specifies a coordinate of the position of the index finger from the images generated by the image pickup sections 171B and 172B. The control section 110B recognizes, the infrared ray appearing in the images generated by the image pickup sections 171B and 172B as a finger and adds an identifier (e.g., "6") to the recognized finger. The projector 10A and the projector 10B separately recognize the fingers. Therefore, an identifier added to the index finger by the projector 10B is different from an identifier added by the projector 10A. The control section 110B transmits information indicating a state of the finger, the stored tiling number, a coordinate of the detected position of the finger, and an identifier of the finger corresponding to the coordinate to the projector 10A.

When the interface 160A acquires the information indicating the pen-on state, the tiling number, the identifier, and the coordinate transmitted from the projector 10B, the control section 110A acquire a latest coordinate among coordinates of the finger, the identifier of which is "1", and determines whether a difference between a y coordinate of the latest coordinate acquired from the RAM and a y coordinate of the coordinate transmitted from the projector 10B is smaller than a threshold. When the difference between the y coordinate of the latest coordinate acquired from the RAM and the y coordinate of the coordinate transmitted from the projector 10B is smaller than the threshold, the control section 110A recognizes that the finger, the identifier of which is "6", and the finger, the identifier of which is "1", are the same finger and returns the state of the finger, the identifier of which is "1", to the pen-on state. Subsequently, the control section 110A processes an x coordinate of the coordinate transmitted to the information processing apparatus 30 according to Expression (2). The control section 110A transmits the information indicating the state (pen-on) of the finger and the coordinate (x, y) after the processing to the information processing apparatus 30. When acquiring the coordinate transmitted from the projector 10A, the information processing apparatus 30 executes processing corresponding to the acquired information.

In the embodiment, the two projectors project images and display one screen. However, three or more projector project images and display one screen.

What is claimed is:

1. A display system comprising:
an information processing apparatus;
a first projector; and
a second projector,
the first projector projecting a first portion of an image output by the information processing apparatus onto a projection surface and the second projector projecting a second portion of the image onto the projection surface, wherein
the second projector includes:
a second projecting section configured to project the second portion onto the projection surface;
a detecting section configured to detect a position of a pointer with respect to the second portion projected on the projection surface and generate second position information representing a position of the pointer in a coordinate system of the second portion; and
a second transmitting section configured to transmit the second position information generated by the detecting section to the first projector,
the first projector includes:
a first projecting section configured to project the first portion onto the projection surface;
a receiving section configured to receive the second position information transmitted by the second transmitting section; and
a first transmitting section configured to (i) transmit position information obtained by converting the second position information received by the receiving section according to a coordinate system of the image or (ii) transmit the second position information received by the receiving section, to the information processing apparatus as first position information, and
the information processing apparatus receives the first position information transmitted by the first transmitting section and performs processing corresponding to the received first position information.

2. The display system according to claim 1, wherein the first projector includes a coordinate converting section configured to convert the second position information received by the receiving section into the first position information according to the coordinate system of the image.

3. The display system according to claim 1, wherein when the first transmitting section transmits the second position information as the first position information, the first transmitting section transmits information representing the second portion to the information processing apparatus together with the first position information, and
the information processing apparatus receives the information representing the second portion and the first position information transmitted by the first transmitting section and performs processing corresponding to the received information representing the second portion and the received first position information.

4. The display system according to claim 2, wherein the first projector includes a second detecting section configured to detect a position of the pointer with respect to an image of the first portion projected on the projection surface and generates position information representing a position of the pointer in a coordinate system of the first portion, and
when the pointer moves across a boundary between the first portion and the second portion, the first projector recognizes the position information generated by the second detecting section and the second position information as position information of a same pointer.

5. The display system according to claim 4, wherein the pointer is a finger of a user, and
when the finger moves across the boundary between the first portion and the second portion, the first projector recognizes the position information generated by the second detecting section and the second position information as position information of a same finger.

6. A projector comprising:
a projecting section configured to project a first portion of an image output by an information processing apparatus onto a projection surface;
a receiving section configured to receive second position information from a second projector, the second projector projecting a second portion of the image output by the information processing apparatus onto the projection surface, the second projector detecting a position of a pointer with respect to the second portion projected on the projection surface, the second projector transmitting the second position information representing a position of a pointer in a coordinate system of the second portion; and
a first transmitting section configured to (i) transmit position information obtained by converting the second position information received by the receiving section according to a coordinate system of the image or (ii) transmit the second position information received by the receiving section, to the information processing apparatus as first position information.

7. A control method for a display system including a first projector and a second projector, the first projector projecting a first portion of an image output by the information processing apparatus onto a projection surface and the second projector projecting a second portion of the image onto the projection surface,
the control method comprising:
allowing the second projector to detect a position of a pointer with respect to the second portion projected on the projection surface and generate second position information representing a position of the pointer in a coordinate system of the second portion;
allowing the second projector to transmit the second position information to the first projector;
allowing the first projector to receive the second position information;
allowing the first projector to (i) transmit position information obtained by converting the second position information according to a coordinate system of the image or (ii) transmit the second position information, to the information processing apparatus as first position information; and
allowing the information processing apparatus to receive the first position information and performing processing corresponding to the received first position information.

* * * * *